United States Patent
Kimmig

(10) Patent No.: US 6,273,229 B1
(45) Date of Patent: Aug. 14, 2001

(54) FRICTION CLUTCH WITH DAMPER FOR VIBRATIONS OF DIAPHRAGM SPRING

(75) Inventor: Karl-Ludwig Kimmig, Bühl-Waldmatt (DE)

(73) Assignee: LuK Lamellen und Kupplungsbau GmbH, Buhl (DE)

( * ) Notice: Subject to any disclaimer, the term of this patent is extended or adjusted under 35 U.S.C. 154(b) by 0 days.

(21) Appl. No.: 09/521,303

(22) Filed: Mar. 9, 2000

Related U.S. Application Data

(63) Continuation of application No. 08/955,186, filed on Oct. 21, 1997, now abandoned.

(30) Foreign Application Priority Data

Oct. 24, 1996 (DE) .............................................. 196 44 194

(51) Int. Cl.⁷ .............................. F16D 13/75; F16D 13/50
(52) U.S. Cl. .................................... 192/70.25; 192/70.27; 192/89.23; 192/30 V
(58) Field of Search .............................. 192/30 V, 70.17, 192/70.25, 70.27, 89.23, 200, 109 A, 111 A

(56) References Cited

U.S. PATENT DOCUMENTS

| | | | | |
|---|---|---|---|---|
| 3,702,651 | * | 11/1972 | Fujita et al. ........................ | 192/70.25 |
| 4,126,216 | * | 11/1978 | Babcock et al. ............... | 192/30 V X |
| 5,054,598 | * | 10/1991 | Tojima .............................. | 192/70.27 |
| 5,450,934 | * | 9/1995 | Maucher ........................... | 192/70.25 |
| 5,894,916 | * | 4/1999 | Grupp et al. ...................... | 192/70.25 |

FOREIGN PATENT DOCUMENTS

1437640 * 6/1976 (GB) .................................. 192/30 V

* cited by examiner

*Primary Examiner*—Richard M. Lorence
(74) *Attorney, Agent, or Firm*—Darby & Darby

(57) ABSTRACT

A friction clutch wherein a damper which operates with friction between the housing and the clutch spring serves to minimize or to prevent axial stray movements of the diaphragm spring relative to the housing. This eliminates chatter and/or other forms of noise which unrestricted axial oscillatory movements of the diaphragm can cause in a conventional friction clutch or in a power train employing a conventional friction clutch.

32 Claims, 2 Drawing Sheets

FRICTION CLUTCH WITH DAMPER FOR VIBRATIONS OF DIAPHRAGM SPRING

CROSS-REFERENCE TO RELATED APPLICATION

This is a continuation of application Ser. No. 08/955,186 filed Oct. 21, 1997 for "FRICTION CLUTCH WITH DAMPER FOR VIBRATIONS OF PRESSURE PLATE", now abandoned.

The invention relates to improvements in friction clutches, particularly to improvements in friction clutches which can be utilized in the power trains of motor vehicles, for example, to transmit torque between a prime mover and a manual or automated change-speed transmission of the power train. Still more particularly, the invention relates to improvements in friction clutches of the type wherein a rotary pressure plate is biased by a clutch spring (such as a diaphragm spring which reacts against a rotary housing) to urge the friction linings of a rotary clutch disc or clutch plate against an engine-driven counterpressure plate (such as a flywheel) when the clutch is engaged to transmit torque from the counterpressure plate to the clutch disc and thence to the input element of a transmission. The clutch spring can constitute a diaphragm spring having elastic prongs which form part of the means for engaging and disengaging the friction clutch, i.e., to cause the clutch spring to urge the pressure plate against the friction linings of the clutch disc (and to thus urge the friction linings against the adjacent friction surface of the engine-driven counterpressure plate) or to permit a set of leaf springs or the like to move the pressure plate axially and away from the counterpressure plate and to thus permit the rotary parts of the clutch to rotate relative to the clutch disc and/or vice vwersa.

Friction clutches of the above outlined character are disclosed, for example, in commonly owned U.S. Pat. No. 5,536,208 (granted Jul. 16, 1996 to Klaus-Dieter Krumm for APPARATUS FOR DAMPING VIBRATIONS IN POWER TRAINS OF MOTOR VEHICLES), in commonly owned U.S. Pat. No. 5,450,934 (granted Sep. 19, 1995 to Paul Maucher for FRICTION CLUTCH), in U.S. Pat. No. 5,513,736 (granted May 7, 1996 to Hiroshi Mizukami for CLUTCH COVER ASSEMBLY HAVING A WEAR COMPENSATION DEVICE), in U.S. Pat. No. 5,513,735 (granted May 7, 1996 to Norihisa Uenohara for CLUTCH COVER ASSEMBLY HAVING A WEAR COMPENSATION DEVICE), in U.S. Pat. No. 5,377,803 (granted Jan. 3, 1995 to Achim Link et al. for PRESSURE PLATE ARRANGEMENT FOR A MOTOR VEHICLE FRICTION CLUTCH), in published German patent application Serial No. 42 39 289, and in published German patent application Serial No. 43 37 613.

Several of the above-enumerated publications disclose friction clutches wherein the pressure plate is automatically shifted toward the counterpressure plate (when necessary) to compensate for wear upon the friction linings of the clutch disc between the pressure plate and the counterpressure plate and, if necessary, for wear upon certain other constituents (such as the pressure plate and/or the clutch spring and/or the counterpressure plate) of the friction clutch. The compensation for wear can take place by moving the clutch spring and/or the pressure plate axially and away from the housing (i.e., toward the counterpressure plate) of the friction clutch, or by moving the pressure plate axially and away from the housing and clutch spring toward the counterpressure plate.

The disclosures of the aforementioned U.S. Patent and of the aforementioned published German patent applications (to the extent their matter is disclosed in allowed and/or patented United States patent applications) are incorporated herein by reference. For example, U.S. Pat. No. 5,536,208 to Krumm discloses the manner in which the housing, the pressure plate and the counterpressure plate of a friction clutch can be driven by the output element of an engine in the power train of a motor vehicle, and U.S. Pat. No. 5,450,934 to Maucher discloses a wear compensating mechanism which is fully automated so that it shifts the pressure plate toward the counterpressure plate whenever it becomes necessary to compensate for wear at least upon the friction linings of the clutch disc but preferably also upon one or more additional constituents or component parts of the patented friction clutch. Furthermore, Maucher discloses clutch discs wherein the friction linings flank resilient segments which are compressed during engagement of the friction clutch and are free to expand during disengagement of the clutch to thus permit smooth engagement and disengagement of such torque transmitting system.

OBJECTS OF THE INVENTION

An object of the invention is to provide a friction clutch which is constructed and assembled and operates in such a way that it is less likely to generate noise during partial or full engagement and/or disengagement (as well as in the fully engaged or disengaged condition) of the clutch than heretofore known friction clutches.

Another object of the invention is to counteract or to eliminate certain stray movements of various component parts of a friction clutch.

A further object of the invention is to provide a friction clutch wherein the clutch spring and/or the pressure plate is mounted in such a way that it is prevented from carrying out any, or any excessive, axial stray movements during each and every stage of operation of the friction clutch or at least during those stages when certain stray movements and the resulting noise would be unpleasant and/or highly unpleasant to the operator and other occupant or occupants of a motor vehicle wherein the power train contains at least one friction clutch of the above outlined character.

An additional object of the invention is to provide a friction clutch wherein stray movements (such as radial and/or axial oscillatory movements) of one or more constituents of the friction clutch are either eliminated or reduced to an intensity and/or frequency which cannot entail untimely (i.e., unnecessary and undesirable) adjustments for (non-existent or negligible) wear upon the friction linings of the clutch disc and/or upon certain other component parts of the friction clutch.

Still another object of the invention is to provide a friction clutch which, when employed in the power train of a motor vehicle, can enhance the comfort to the operator and to other occupant(s) of the motor vehicle during certain stages or during each and every stage of operation or manipulation of the vehicle.

A further object of the invention is to provide a power train which embodies a friction clutch of the above outlined character.

Another object of the invention is to provide a motor vehicle which embodies one or more friction clutches of the above outlined character.

An additional object of the invention is to provide a novel and improved method of minimizing or eliminating undesirable stray movements of one or more component parts of a friction clutch, such as a friction clutch which is designed for use in the power train of a motor vehicle.

Another object of the invention is to provide a novel and improved damper for use in a friction clutch to minimize or to eliminate undesirable noise-generating stray movements of the pressure plate and/or of the clutch spring in a friction clutch which can be utilized with advantage, for example, between the engine and the transmission in the power train of a motor vehicle.

A further object of the invention is to provide a simple, compact and inexpensive but reliable damper for weakening or for complete elimination of stray movements of the clutch spring and/or pressure plate in a friction clutch.

SUMMARY OF THE INVENTION

The invention is embodied in an engageable and disengageable friction clutch which comprises a housing rotatable about a predetermined axis, a counterpressure plate (such as a flywheel) coaxial and rotatable with the housing, a pressure plate which is rotatable with the housing and has limited freedom of axial movement toward and away from the counterpressure plate, a clutch disc including a portion which is disposed between the pressure plate and the counterpressure plate, a clutch spring which reacts against the housing to urge the pressure plate against the aforementioned portion of the clutch disc and to thus urge such portion of the clutch disc against the counterpressure plate in the engaged condition of the clutch, means for engaging and disengaging the clutch, and a damper which operates between the clutch spring and an axially fixed component of the clutch to counteract stray movements which the clutch spring and/or the pressure plate tends to perform relative to the housing.

The means for rotating the housing or the counterpressure plate preferably forms part of the power train in a motor vehicle. For example, the counterpressure plate can receive torque from the camshaft or crankshaft of the combustion engine of a motor vehicle.

As a rule, the stray movements include (or can constitute) movements in the general direction of the common axis of the housing, pressure plate and counterpressure plate.

The housing can form part of or can constitute the axially fixed component of the improved clutch.

The damper can react directly against the axially fixed component or against the clutch spring and can bear directly against the clutch or the axially fixed component. The arrangement is preferably such that the damper is in frictional engagement with the clutch spring or with the axially fixed component.

The clutch spring preferably includes or constitutes at least one diaphragm spring. Such diaphragm spring includes prongs extending radially of the axis of the housing and constituting or forming part of the means for engaging or disengaging the clutch. The diaphragm spring includes a radially outer portion which is more distant from the axis of the housing and engages the pressure plate at least in the engaged condition of the clutch, and a radially inner portion which is nearer to the axis of the housing and is tiltably coupled to the housing by a suitable seat, e.g., a seat including two coaxial wire rings which flank the radially inner portion of the diaphragm spring.

The at least one diaphragm spring of the clutch spring forms part, or can be considered to form part, of the damper. The latter preferably constitutes a hysteretic damper which includes at least one member arranged to establish frictional hysteresis between the axially fixed component of the clutch and the clutch spring. The at least one member can operate between the at least one diaphragm spring of the clutch spring and the axially fixed component of the clutch. The at least one member can include a first portion which is held against movement relative to the housing in the direction of the axis of the housing, and a second portion which frictionally engages a radially outer portion of the clutch spring, such as the marginal portion of the at least one diaphragm spring. The second portion of the at least one member of the damper can include a plurality of projections, preferably resilient projections which bear upon the marginal portion of the diaphragm spring in a direction at least substantially radially of and toward the axis of the housing. The first portion of the at least one member of the damper can constitute a circumferentially complete annulus or a composite annulus having a radially inner part which is or which can be of one piece with the projections. The first portion of the at least one member can be affixed to the housing of the clutch. As already mentioned above, the second portion of the at least one member (i.e., the aforementioned projections) is resilient and can be stressed to bear upon the clutch spring in a direction radially of and toward the axis of the housing, and such second portion can extend in exact or at least substantial parallelism with the axis of the housing. The force with which the second portion of the at least one member of the damper bears upon the clutch spring can be in the range of between 200N and 2000N, particularly between 400N and 1000N. Furthermore, the second portion of the at least one member can be designed, dimensioned and mounted in such a way that it is fixed (i.e., that it cannot move) in the general direction of the axis of the housing.

The aforementioned portion (friction linings) of the clutch disc is subject to wear in response to repeated engagement and disengagement of the clutch. The clutch spring, the pressure plate, the counterpressure plate and the means (such as leaf springs) for axially movably coupling the pressure plate to the housing are also subject to wear. Therefore, the improved friction clutch preferably further comprises means for compensating for such wear, and the compensating means can include means for moving the pressure plate substantially axially toward the counterpressure plate. The moving means can include means for moving the pressure plate toward the counterpressure plate relative to the clutch spring. The means for compensating can further include means for monitoring the extent of wear at least upon the friction linings of the clutch disc and for regulating the extent of movement of the pressure plate toward the counterpressure plate as a function of the monitored extent of wear, i.e., the compensation can be carried out automatically whenever necessary.

The novel features which are considered as characteristic of the invention are set forth in particular in the appended claims. The improved friction clutch itself, however, both as to its construction and the mode of assembling, installing and operating the same, together with numerous additional important features and advantages thereof, will be best understood upon perusal of the following detailed description of certain presently preferred specific embodiments with reference to the accompanying drawings.

DESCRIPTION OF PREFERRED EMBODIMENTS

Figure 1:
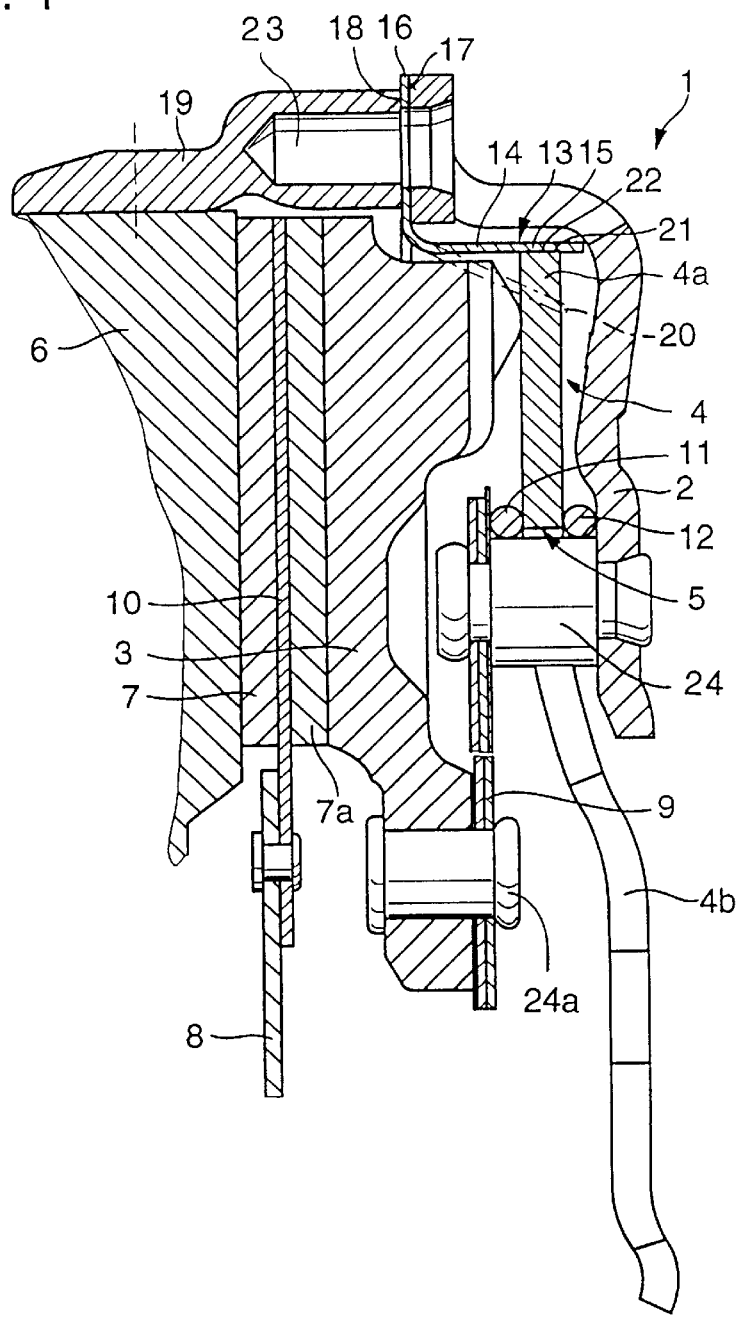
FIG. 1 is a fragmentary axial sectional view of a first friction clutch which is provided with a damper embodying one form of the present invention.
Figure 2:
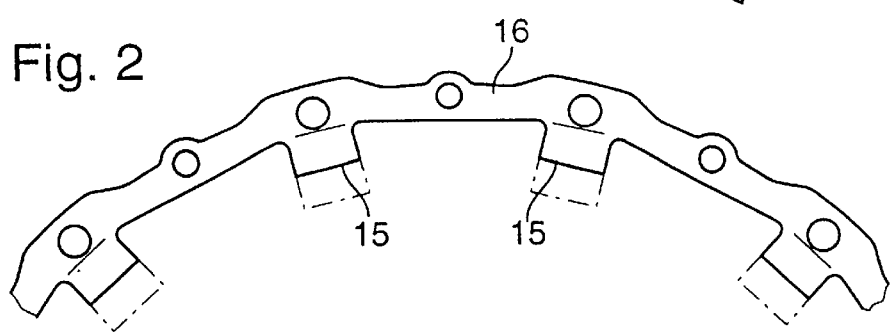
FIG. 2 is a fragmentary smaller-scale elevational view of a member forming part of the damper which is shown in FIG. 1.

FIGS. 1 and 2 show certain details of a friction clutch 1 which comprises a rotary housing 2 coaxial with and normally receiving torque from a counterpressure plate 6 which can constitute a flywheel and can be separably secured to the output element (such as a camshaft or a crankshaft) of a combustion engine (see the referenced U.S. Pat. No. 5,450, 934). A pressure plate 3 is located between the housing 2 and the counterpressure plate 6 and is non-rotatably secured to the housing by leaf springs 9 for movement, with limited freedom, toward and away from the friction linings 7, 7a of a rotary clutch disc or clutch plate 8 on the input shaft (not shown) of a transmission (refer again to U.S. Pat. No. 5,450,934).

The clutch 1 is partially or fully engaged when the friction linings 7, 7a are clamped (without any slip or with a selected amount of slip) between the adjacent friction surfaces of the plates 3 and 6. The pressure plate 3 can be biased in a direction toward the friction linings 7, 7a and the counterpressure plate 6 by the radially outer portion 4a of a clutch spring here shown as consisting of a single diaphragm spring 4 which is tiltably carried by the bottom wall or rear wall of the housing 2, namely by a composite seat 5 including two coaxial wire rings 11, 12 which flank a portion of the diaphragm spring radially inwardly of the radially outer portion 4a. The diaphragm spring 4 further comprises radially inwardly extending prongs 4b which form part of the means for engaging and disengaging the friction clutch 1. The free (radially inner) end portions of the prongs 4b must be depressed (toward the clutch disc 8) in order to tilt the diaphragm spring 4 between the wire rings 11, 12 of the seat 5 and to thus move the radially outer portion 4a of the diaphragm spring away from the counterpressure plate 6; this results in a partial or full disengagement of the clutch 1. The common axis of the housing 2, plates 3, 6, diaphragm spring 4 and clutch disc 8 corresponds to the axis X—X shown in FIG. 3.

The clutch 1 of FIG. 1 is a so-called push-type clutch because the free radially inner end portions or tips of the prongs 4b must be depressed (toward the pressure plate 3 and clutch disc 8) in order to (partially or fully) disengage the clutch. However, the invention can be embodied with equal or similar advantage in a so-called pull-type friction clutch wherein the tips of the prongs 4b must be moved away from the pressure plate in order to at least partially disengage the clutch. The locus of contact between the diaphragm spring and the pressure plate is then disposed radially inwardly of the seat 5 or an equivalent seat.

The character 10 denotes one or more resilient segments between the friction linings 7, 7a of the clutch disc 8; such segment or segments (hereinafter referred to as segments) undergo a gradually increasing compression during movement of the pressure plate 3 toward the counterpressure plate 6 (i.e., during a change of the condition of the clutch 1 toward a condition of full engagement when the friction linings 7, 7a are compelled to share all rotary movements of the counterpressure plate), and the segments 10 can undergo a gradually decreasing compression during disengagement of the clutch 1, i.e., while the pressure plate 3 moves axially and away from the counterpressure plate 6.

The torque transmitting connection between the counterpressure plate 6 and the housing 2 includes threaded fasteners 23 which connect the housing 2 with an annular member 19 rigidly affixed to and surrounding the counterpressure plate 6. The parts 2, 19 and 6 together constitute an axially fixed component of the friction clutch 1.

The leaf springs 9 can be replaced by (or used jointly with) other suitable means for non-rotatably but axially movably coupling the pressure plate 3 to the axially fixed component 2, 19, 6. Furthermore, the resilient segments 10 constitute an optional part of the clutch disc 8, i.e., the latter can comprise a plain washer-like radially outer portion (of sheet metal or the like) which is flanked by and carries the friction linings 7, 7a. However, the resilient segments 10 are preferred when the designer of the friction clutch 1 desires to ensure a gradual increase or a gradual reduction of torque which is to be transmitted between the friction surfaces of the plates 3, 6 and the adjacent exposed surfaces of the respective friction linings 7a, 7 during axial movement of the pressure plate toward or away from the counterpressure plate, i.e., away from and toward the radially extending rear or bottom wall of the housing 2.

FIG. 1 shows the friction clutch 1 in the fully engaged condition, i.e., the pressure plate 3 cooperates with the counterpressure plate 6 to clamp the friction linings 7, 7a with a force which suffices to ensure that the plates 3, 6, the housing 2 and the clutch disc 8 rotate as a unit. Also, the segments 10 are fully compressed, e.g., to an extent to act as a flat rigid insert between the friction linings 7 and 7a. If the segments 10 are utilized in the clutch disc 8 of a friction clutch which is employed in the power train of a passenger car, the resiliency of such segments can be selected in such a way that they can undergo a compression within the range of between about 0.3 and 1.1 millimeter; as a rule, such range is between 0.5 and 0.8 mm.

It has been found that, when a standard friction clutch is utilized in the power train of a motor vehicle (e.g., between the rotary output element of a combustion engine or another suitable prime mover and the rotary input element of a manual or automated transmission), at least the pressure plate and/or the diaphragm spring is likely to perform undesirable stray movements during certain stages of operation of the motor vehicle. At least some such stray movements take place in the direction of rotational axis of the clutch housing, and the extent of such movements depends upon a plurality of factors such as the design of the prime mover, the presence or absence of resilient segments between the friction linings of the clutch disc and others. The frequency of stray movements can be high or very high, and the amplitude of such movements can be low or very low.

It was also determined that the aforediscussed stray movements are especially likely to develop during engagement or disengagement of the friction clutch, namely while the friction linings are caused or permitted to slip relative to the adjacent friction surfaces of the pressure plate and the counterpressure plate, i.e., when the friction clutch is set to transmit some torque but less than a maximum torque which is normally transmitted when the pressure plate, the counterpressure plate and the clutch disc rotate as a unit.

The stray movements (especially high-frequency oscillations in the axial direction of the clutch housing) of the pressure plate and/or of the diaphragm spring tend to cause stray movements of the entire power train in which a conventional friction clutch is being put to use. The stray movements of the power train or of certain constituents of the power train can be axial as well as rotary stray movements. It is believed that one reason for the transmission of stray movements from the pressure plate and/or diaphragm spring of a standard clutch to the power train is as follows: Axial oscillations of the pressure plate (with or without the diaphragm spring) entail high-frequency changes in frictional engagement between the pressure plate and the counterpressure plate on the one hand and the adjacent friction linings on the other hand, i.e., the torque which is being transmitted between the pressure plate and the counterpressure plate on the one hand and the clutch disc on the other hand will fluctuate regardless of whether the clutch disc comprises one or more resilient segments. Such fluctuations of the transmitted torque are especially likely to develop when a conventional friction clutch is only partially engaged, i.e., when the resilient segments and/or the friction linings are not compressed to a maximum extent. This can entail an excitation and resulting rattling of the power train.

The frequency and/or other parameters of stray movements of the diaphragm spring and/or pressure plate can coincide with the characteristic vibrations of the power train; under such circumstances, the power train is even more likely to generate readily detectable rattling and/or other noises and/or to perform recurrent stray movements of a nature or intensity shared by the entire motor vehicle with attendant discomfort to the operator as well as to other occupant(s) of the motor vehicle.

It was further ascertained that at least the pressure plate can generate readily detectable noise when the friction clutch is, fully disengaged so that the pressure plate and the counterpressure plate are free to rotate relative to the clutch disc and/or vice versa; such noise is especially likely to develop when the pressure plate is caused or permitted to perform high-frequency low-amplitude stray movements, e.g., in the direction of the axis of the clutch housing. These stray movements are normally shared by one or more additional parts of the clutch, e.g., by the housing.

In order to overcome the aforediscussed drawbacks of conventional friction clutches, the friction clutch 1 of FIG. 1 is provided with a novel and improved damper 13 which operates between the diaphragm spring 4 and the axially fixed component 2, 19, 6 of the clutch and is designed to eliminate (or at least greatly weaken) stray movements of the pressure plate 3 and/or diaphragm spring 4. The illustrated damper 13 comprises a member 14 which is constructed, installed and designed to establish frictional hysteresis between the axially fixed component 2, 19, 6 of the clutch 1 and the diaphragm spring 4.

As can be best seen in FIG. 2, the member 14 of the damper 13 includes an annular first portion 16 which is held against movement relative to the housing 2, and a resilient second portion including an annulus of preferably equidistant projections in the form of lugs or tongues 15 which are stressed in a direction radially inwardly toward the axis of the housing 2 and bear upon the radially outer portion 4a of the diaphragm spring 4. The first portion 16 of the member 14 is a washer-like part which is clamped between the housing 2 and the member 19 so that it is held against any and all movements relative to the axially fixed component 2, 19, 6 of the friction clutch 1. The first portion 16 has holes (see FIG. 2) for the externally threaded shanks of the fasteners 23. In the embodiment of FIG. 1, the projections 15 are of one piece with the radially inner part of the first portion 16 of the member 14 forming part of the improved damper 13. The first portion 16 is flattened between an annular surface 17 on a radially outwardly extending flange of the housing 2 and a radially extending annular surface 18 of the part 19 of the axially fixed component of the clutch 1.

The making of the portion 16 of one piece with the portion including the projections 15 simplifies and reduces the cost of making the member 14 and also simplifies the mounting of such member between the surfaces 17, 18 by the same means (fasteners 23) which are used to rigidly secure the housing 2 and the part 19 to each other, i.e., which transmit torque from the counterpressure plate 6 to the housing which, in turn, transmits torque to the pressure plate 3 (via leaf springs 9) and to the diaphragm spring 4 (via rivets 24 which secure the leaf springs 9 to the housing 2). Additional rivets 24a are provided to affix the leaf springs 9 to the pressure plate 3.

The counterpressure plate 6 can form part of a composite flywheel, e.g., a flywheel including a primary flywheel driven by the output element of a combustion engine, a secondary flywheel adjacent the friction lining 7, and at least one set of energy storing elements (such as coil springs) between the primary and secondary flywheels. Reference may be had to commonly owned published German patent application Serial No. 43 31 454 and to the aforementioned commonly owned U.S. Pat. No. 5,536,208.

The one-piece circumferentially complete annular first portion 16 of the member 14 can be replaced with two or more discrete arcuate portions (not specifically shown) each of which carries one or more projections 15. For example, each projection 15 can be provided with an extension or lug (corresponding to a fraction of the illustrated circumferentially complete annular portion 16) which is clamped between or otherwise fixedly secured to the housing 2 and part 19. Alternatively, the one-piece portion 16 can be replaced with two or more arcuate parts each of which carries two or more projections 15 and each of which can be rigidly secured to the housing 2 and/or to the part 19.

The portions 15, 16 of the member 14 can be made of sheet steel stock which exhibits the required resiliency so that the projections 15 can bear against the periphery 21 of the radially outer portion 4a of the diaphragm spring 4 with a required force which suffices to counteract or prevent the development of the afore-discussed undesirable stray movements of the pressure plate 3 and/or diaphragm spring 4 relative to the axially fixed component 2, 19, 6.

When they are unstressed, the projections 15 can assume the positions shown at 20, i.e., they are inclined in a direction from the surfaces 17, 18 toward the axis of the housing 2 and away from the counterpressure plate 6. Once the friction clutch 1 is fully assembled, the projections 15 are at least substantially parallel to the axis of the housing 2 and thus store adequate amounts of energy to bear against the periphery 21 of the radially outer portion 4a of the diaphragm spring 4 with a requisite force. The region of contact between the stressed projections 15 and the radially outer portion 4a of the spring 4 is denoted by the character 22.

A presently preferred mode of installing the damper 13 is as follows: The radially outer portion 16 of the member 14 is fixed to the surface 17 of the radially outwardly extending flange of the housing 2 (or is merely positioned in such a way that the projections 15 extend into the interior of the housing) so that the projections 15 assume the positions 20, and the diaphragm spring 4 is thereupon inserted into the housing so that its radially outer portion 4a pivots the projections 15 from the positions 20 to positions (one shown in FIG. 1 by solid lines) in which they extend in parallelism with the axis of the housing 2 and bear against the periphery 21 of the radially outer portion 4a of the diaphragm spring 4. The diaphragm spring 4 is thereupon secured to the housing 2 by the rivets 24 so that it is located between the rings 11, 12 of the seat 5. The next step involves insertion of the pressure plate 3 and securing of the pressure plate to the leaf springs 9 by the rivets 24a. The friction lining 7a of the clutch disc 8 is thereupon placed against the friction surface of the pressure plate 3 and the part 19 is secured to the flange of the housing 2 by the threaded fasteners 23.

The holes (see FIG. 2) in the portion 16 of the member 14 serve to receive the shanks of the fasteners 23. Alternatively, some of these holes can receive suitable pins or analogous parts (not shown) which serve to center the part 19 and the housing 2 relative to each other.

If the clutch disc 8 is provided with resilient segments 10 between the friction linings 7 and 7a, such segments can be configured and installed in a manner as disclosed, for example, in the published German patent application Serial No. 43 00 665.

During engagement of the friction clutch 1, the pressure plate 3 and the region 22 of contact between the projections 15 and the periphery 21 of the radially outer portion 4a of the diaphragm spring 4 move in a direction to the right, as viewed in FIG. 1, i.e., axially of the housing 2 and away from the counterpressure plate 6. This results in a gradual reduction of the stress upon the resilient segments 10 of the clutch disc 8. The diaphragm spring 4 is being tilted (as a result of axial movement of the tips of the prongs 4b toward the clutch disc 8) between the rings 11, 12 of the seat 5 so that the radially outer portion 4a (i.e., also the periphery 21) moves away from the clutch disc so that the periphery 21 slides relative to the projections 15 which are maintained (by the clamped annular portion 16) in fixed axial positions relative to the housing 2.

The just described movement of the radially outer portion 4a of the diaphragm spring 4 away from the clutch disc 8 takes place against a pronounced resistance due to frictional engagement between the projections 15 and the surface 21. The frictional hysteresis is dependent upon the friction coefficients of the materials which are caused to slide relative to each other in the region 22 of contact between the diaphragm spring 4 and the member 14 as well as upon the finish of the periphery 21 and/or the adjacent sides of the projections 15. Such hysteresis counteracts the tendency of the radially outer portion 4a of the diaphragm spring 4 and of the pressure plate 3 to perform any noticeable stray movements (particularly axial stray movements) relative to the housing 2. It has been found that the suppression of stray movements by resorting to the damper 13 is pronounced, reliable and long-lasting, i.e., the damper can be effective during the entire useful life of the friction clutch.

The stressing of the projections 15 must be selected as a function of the bias of the diaphragm spring 4 upon the pressure plate 3 and also as a function of the bias of the resilient segments 10 which tend to expand when the friction clutch 1 is in the partly engaged condition, namely when the friction between the friction surfaces of the plates 3, 6 and the adjacent friction linings 7a, 7 suffices to ensure that the clutch disc 8 is compelled to share (with a more or less pronounced slip) the rotary movements of the plates 3, 6 and/or vice versa. Adequate damping of stray movements of the pressure plate 3 and diaphragm spring 4, particularly in the direction of the axis of the housing 2, is especially important when the clutch 1 is partially engaged, i.e., when the clutch disc 8 must rotate with but is also free to slip relative to the plates 3 and 6. The axial force with which the pressure plate 3 bears upon the adjacent friction lining 7a is a function of the bias of (energy stored in) the resilient segments 10.

Predictable frictional engagement between the radially inwardly stressed projections 15 and the radially outer portion 4a of the diaphragm spring 4 can be achieved if the mounting of the projections 15 is such that they are held against movement relative to the annular portion 16 in the axial direction of the housing 2. This is achieved by the establishment of a reliable connection between the annular portion 16 on the one hand and the housing 2 and part 19 on the other hand, as well as by the establishment between portion 16 and projections 15 of a connection which preferably withstands any and all movements of the projections 15 relative to the portion 16 in the axial direction of the housing 2.

It was found that the damper 13 will operate satisfactorily if the stressing of projections 15 is such that they bear against the periphery of the radially outer portion 4a of the diaphragm spring 4 with a force in the range of between 200N and 2000N, preferably in the range of between 400N and 1000N. Such force is the sum of forces exerted by individual projections 15. In other words, each of the projections 15 can exert a smaller force if the number of such projections is increased, and vice versa.

High-frequency axial stray movements of the pressure plate 3 can be readily controlled or prevented as a result of the provision of the improved damper 13 which operates with friction between one or more axially fixed components (2, 6 and/or 19) and the diaphragm spring 4 of the clutch 1. In addition, the operation of the improved damper 13 is such that not only the housing 2 but also the power train which embodies the friction clutch 1 is positively and reliably held against undesirable oscillatory or reciprocatory movements with attendant reliable reduction or elimination of noise, namely of noise (such as rattling) which develops in power trains employing conventional friction clutches as a result of the absence of a resistance to axially oriented oscillations or vibrations of the type which can be readily counteracted by the damper 13.

As a rule, the pressure plate of a standard friction clutch will exhibit a tendency to perform undesirable axial stray movements when the counterpressure plate receives torque from the crankshaft of a combustion engine wherein the crankshaft is permitted or caused to perform axial vibrations or vibrations developing as a result of repeated bending of the crankshaft. In many instances, at least some such stray movements of the crankshaft are transmitted, at least in part, to one or more parts of the friction clutch.

The parts of a friction clutch are also subjected to the action of forces which are attributable to or dependent upon the mass of such parts as well as to fluctuations of torque transmitted and acceleration imparted to such parts. The just discussed fluctuations can develop in response to abrupt changes of load upon the engine as well as in response to changes of operation of the engine.

Even though the damper is directly associated with the diaphragm spring 4 (rather than with the pressure plate 3), it can nevertheless counteract (i.e., either eliminate or at least reduce to a tolerable value the undesirable effects of) at least the high-frequency axial stray movements of the pressure plate. As already mentioned above, undesirable axial stray movements are especially likely to develop in the friction clutch and/or in the entire power train when the clutch is only partially engaged so that the pressure plate and the friction linings of clutch disc can slip relative to each other before the clutch assumes a fully engaged or a fully disengaged condition.

When a conventional clutch assumes a partially engaged condition, the resilient segments 10 can yield in response to axial oscillations of the pressure plate whereby the latter induces similar stray movements of the clutch spring or of certain portions of the clutch spring. Therefore, damping or total preventing of axial stray movements of the clutch spring by the improved damper 13 exerts a beneficial influence upon the pressure plate 3, i.e., the latter is also held against the carrying out of any, or any noticeable, axial stray movements because the projections 15 exert a damping action upon the diaphragm spring 4. At the very least, the beneficial effect of the damper 13 upon the clutch spring 4 and the pressure plate 3 is sufficiently pronounced to ensure that it can be readily perceived by the operator and other occupant(s) of the motor vehicle because the ride is more comfortable due to a pronounced reduction of noise and/or vibration of the vehicle.

The member 14 of the damper 13 which is shown in FIGS. 1 and 2 is designed to establish a frictional hysteresis between the axially fixed component 2, 19, 6 and the diaphragm spring 4 or another suitable clutch spring. It is to be noted that, though a frictional engagement between the radially stressed projections 15 and the radially outer portion 4a of the diaphragm spring 4 is preferred at this time, it is equally within the purview of the invention to establish a frictional engagement between the member 14 and one or more portions of the diaphragm spring 4 (or another suitable clutch spring) other than or in addition to the radially outer portion 4a. Still further, it is possible to establish a desirable frictional engagement between the projections 15 of the member 14 and a part which is mounted on the diaphragm spring 4. In other words, the diaphragm spring 4 can but need not always form part of the damper 13. If the diaphragm spring is part of the damper (this is shown in FIG. 1), this entails a reduction of the cost of the damper 13 and of the entire friction clutch 1.

The provision of a damper which employs a member (14) comprising resilient projections (15) of one piece with the (one-piece or multiple-piece) annular portion (16) also contributes to lower cost of the damper and hence of the entire friction clutch. Moreover, and as already explained hereinbefore, the stressing of the projections 15 can take place in automatic response to insertion of the diaphragm spring 4 into the housing 2 subsequent to (at least temporary or provisional) attachment of the annular portion 16 to the housing. This contributes to the simplicity of assembly and ensures a highly predictable uniform stressing of the projections 15. In fact, the entire damper 13 comprises a preferably one-piece member 14 and means (such as the fasteners 23 which, however, can also perform one or more additional functions) for securing the member 14 to the axially fixed component 2, 19, 6 (or to one or more selected portions (e.g., to the housing 2) of such axially fixed component of the clutch.

Figure 3:
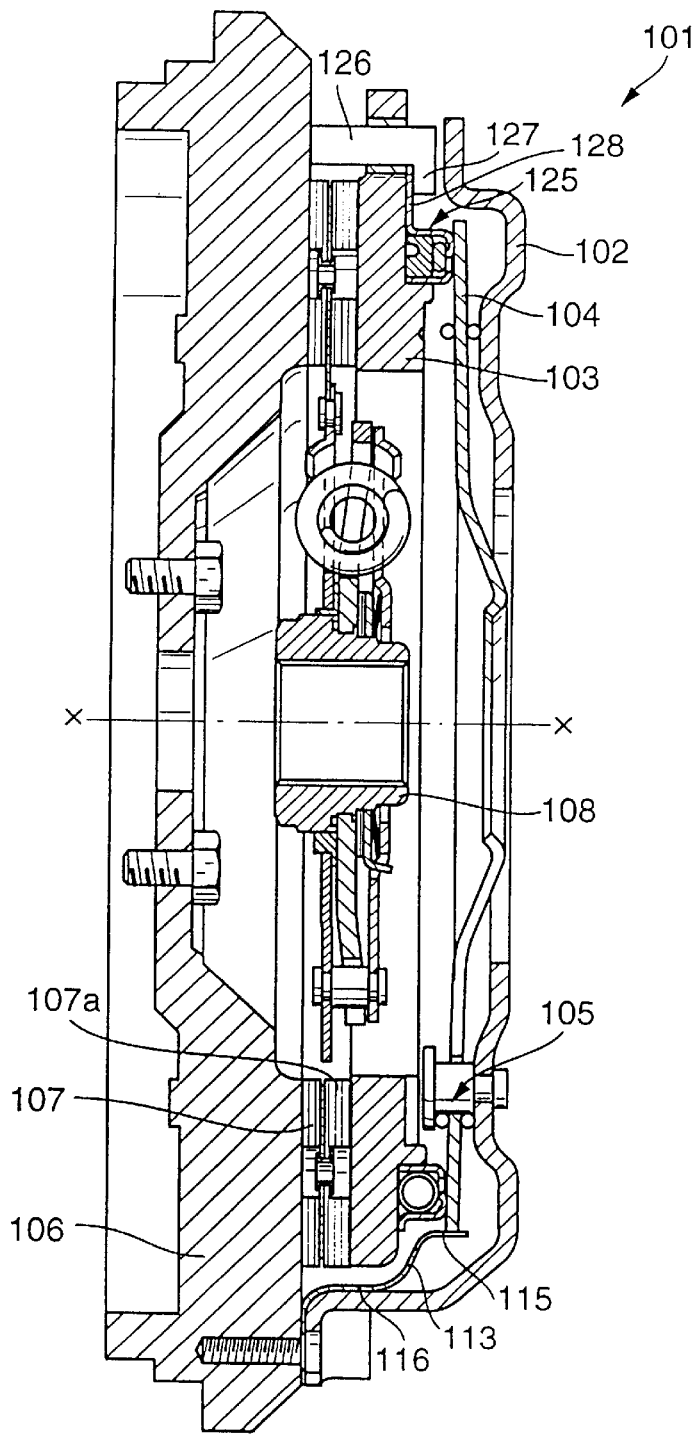
FIG. 3 is an axial sectional view of a modified clutch embodying a damper which is similar to that shown in FIG. 1.

FIG. 3 shows certain relevant parts of a modified friction clutch 101. All such parts of the clutch 101 which are identical with or clearly analogous to the corresponding parts of the clutch 1 of FIGS. 1 and 2 are denoted by similar reference characters plus 100. The clutch 101 further comprises a device 125 which serves to automatically compensate for wear at least upon the friction linings 107, 107a of the clutch disc 108 but preferably also for wear upon certain other parts of the clutch 101 such as at the friction surfaces of the plates 103, 106 and/or upon the regions of contact between the clutch spring 104 on the one hand, and the pressure plate 103 and the seat 105 on the other hand.

The compensating device 125 is designed to move the pressure plate 103 axially toward the counterpressure plate 106 (the latter can constitute a one-piece or a composite flywheel) to thus compensate for wear at least upon the friction linings 107, 107a. This device is installed between the clutch spring 104 (again shown as constituting a single diaphragm spring) and the pressure plate 103 and is automated in that it comprises a sensor 126 which is mounted in the pressure plate 103 and serves to monitor the extent of wear upon the friction linings 107, 107a and to regulate the extent of movement of the pressure plate 103 toward the counterpressure plate 106 (for the purpose of compensating for wear) as a function of the monitored extent of wear.

The operating range of the diaphragm spring 104 remains unchanged during the entire useful life of the friction clutch 101 because the position of the pressure plate 103 relative to the other plate 106 in the fully engaged and disengaged conditions of the friction clutch 101 changes automatically as a result of axial shifting of the pressure plate 103 toward the counterpressure plate 106 at desired or necessary intervals, always as a function of the extent of wear at least upon the friction linings 107, 107a following the initial assembly and thereupon following each preceding adjustment.

The means for actually moving the pressure plate 103 axially toward the counterpressure plate 106 to an extent which is determined by the extent of wear at least upon the friction linings 107, 107a is designed to change the "thickness" of the device 125 in the space between the diaphragm spring 104 and the pressure plate 103 (as seen in the axial direction of the housing 102). The arrangement is such that the compensating device 125 carries out an adjustment in the axial position of the pressure plate 103 (away from the housing 102) in response to actuation of the clutch 101, preferably during disengagement of the clutch, i.e., when the leaf springs (not shown in FIG. 3) or their equivalents are free to move the pressure plate 103 away from the counterpressure plate 106 in order to reduce or to terminate the frictional engagement between the plates 103, 106 and the respective friction linings 107a, 107.

Though FIG. 3 shows a single sensor 126, the compensating device 125 can embody or can cooperate with two or more sensors 126 or equivalent sensors. The illustrated sensor 126 is force-lockingly connected with and extends through the marginal portion of the pressure plate 103 so that its left-hand end can be moved into abutment with the counterpressure plate 106 which shifts the sensor 126 relative to the pressure plate whenever the plate 103 is moved toward the plate 106 at least to a position of full engagement of the clutch 101. Thus, changes in the axial position of the sensor 126 relative to the pressure plate 103 are commensurate with the extent of wear upon the friction linings 107 and 107a.

A stop 127 for the sensor 126 cooperates with an abutment 128 of the device 125 to terminate the widening or thickening of the device 125 between the pressure plate 103 and the diaphragm spring 104 when the extent of such widening or thickening corresponds to the extent of wear at least upon the friction linings 107, 107a.

The compensating device 125 is or can be analogous to or identical with that shown in FIG. 29 of U.S. Pat. No. 5,450,934 to Maucher. The means for moving the pressure plate 103 away from the diaphragm spring 104 to compensate for wear at least upon the friction linings 107, 107a comprises cooperating abutting rotary arcuate or ring-shaped ramps, the same as in the compensating device shown in FIG. 29 of U.S. Pat. No. 5,450,934. Similar or analogous compensating devices are disclosed in the aforementioned published German patent application Serial No. 42 39 289 and in published German patent application Serial No. 43 06 505.

The damper 113 in the friction clutch 101 of FIG. 3 is or can be identical with the damper 13 in the clutch 1 of FIGS. 1 and 2. The only difference between the dampers 13 and 113 is that the latter employs a substantially cup-shaped portion 116 which carries the projections 115. At least the major part of the portion 116 is confined in the housing 102.

The damper 113 is installed to operate between the diaphragm spring 104 and the housing 102 and/or counterpressure plate 106 (rather than between the housing 102 and/or the counterpressure plate 106 on the one hand, and the pressure plate 103 on the other hand) because the pressure plate should remain free to undergo axial adjustments by the compensating device 125, i.e., to compensate for wear at least upon the friction linings 107, 107a. Another prerequisite for satisfactory operation of the compensating device 125 is the absence of any fixed axial connection between the pressure plate 103 and the diaphragm spring 104. Fixed axial connections (e.g., by means of so-called lifting yokes) between the pressure plate and the diaphragm spring are customary in many conventional friction clutches. For example, a conventional lifting yoke can be rigidly secured to the pressure plate and include a portion overlying that side of the clutch spring which faces away from the pressure plate.

The advantages of the damper 113 are the same as the aforediscussed advantages of the damper 13. Thus, the damper 113 can also prevent the development of chatter and/or other forms of noise in the friction clutch 101 and in the power train which employs such friction clutch. The undesirable phenomena are eliminated or at least weakened to a tolerable degree by the simple expedient of engaging the stressed projections 115 with that (radially outer) portion of the diaphragm spring 104 (corresponding to the portion 4a of the diaphragm spring 4) which stores energy at least when the clutch is engaged.

Figure 4:
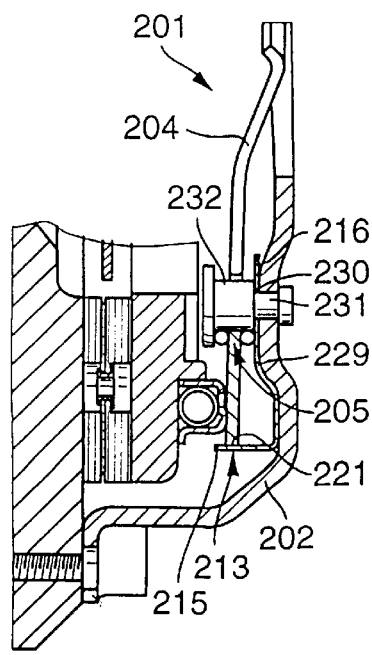
FIG. 4 is a fragmentary axial sectional view of a friction clutch and a damper constituting modifications of those shown in FIG. 3.

FIG. 4 shows a portion of a friction clutch 201 which constitutes a modification of the clutch 101 of FIG. 3. Those parts of the clutch 201 which are identical with or clearly analogous to the corresponding parts of the clutch 1 are denoted by similar reference characters plus 200.

Instead of extending radially outwardly from the projections 215 of the damper 213, the portion 216 includes a part 229 which extends radially inwardly along the inner side of the bottom wall of the housing 202 and is affixed to he housing 202 by the shanks 231 of rivets 232 (only one shown in FIG. 4) which further serve to tiltably secure the clutch spring 204 to the housing in such a way that the spring 204 is flanked by the rings of the seat 205. The shanks 231 extend through openings or windows 230 of the part 229 of the portion 216. It will be noted that the rivets 232 serve to perform several functions including tiltably mounting the clutch spring 204 (such as a diaphragm spring) on the housing 202 and securing the part 229 of the portion 216 of the damper 213 to the bottom wall or rear wall of such housing. The reference character 221 denotes the peripheral surface of the radially outer portion of the diaphragm spring 204.

The disclosures of any allowed U.S. patent applications and/or U.S. patents corresponding to published German patent applications Serial Nos. 43 31, 454, 43 00 665 and 43 06 505 are also incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of friction clutches and, therefore, such adaptations should and are intended to be comprehended within the meaning and range of equivalence of the appended claims.

What is claimed is:

1. An engageable and disengageable friction clutch comprising a first axially fixed component including a housing rotatable about a predetermined axis; a second axially fixed component including a counterpressure plate coaxial and rotatable with said housing; a pressure plate rotatable with said housing and having limited freedom of axial movement toward and away from said counterpressure plate; a clutch disc including a portion disposed between said plates; means for engaging and disengaging the clutch; a diaphragm spring including an annular radially outer portion reacting against said housing to urge said pressure plate against said portion of said clutch disc and to urge said portion of said clutch disc against said counterpressure plate in the engaged condition of the clutch, said means for engaging and disengaging comprising prongs extending substantially radially inwardly from said annular radially outer portion of said diaphragm spring, at least one of said diaphragm spring and said pressure plate having a tendency to perform stray movements relative to said housing; and a frictional hysteresis damper operating between said diaphragm spring and at least one of said axially fixed components of the clutch to counteract said stray movements, said damper being in frictional engagement with at least one of said radially outer portion of said diaphragm spring and said at least one axially fixed component.

2. The clutch of claim 1, wherein said stray movements include movements in the general direction of said axis.

3. The clutch of claim 1, wherein said frictional hysteresis damper reacts directly against one of said housing and said diaphragm spring and bears directly upon the other of said housing and said diaphragm spring.

4. The clutch of claim 1, wherein said damper is in frictional engagement with at least one of said diaphragm spring and said first axially fixed component.

5. The clutch of claim 1, wherein said radially outer portion of said diaphragm spring engages said pressure plate at least in the engaged condition of the clutch, said diaphragm spring further comprising a radially inner portion and further comprising a seat tiltably coupling said radially inner portion of said diaphragm spring to said housing.

6. The clutch of claim 1, wherein said diaphragm spring forms part of said frictional hysteresis damper.

7. The clutch of claim 1, wherein said frictional hysteresis damper includes at least one member arranged to establish frictional hysteresis between said at least one axially fixed component and said radially outer portion of said diaphragm spring.

8. The clutch of claim 7, wherein said at least one member includes a first portion which is held against movement relative to said housing in the direction of said axis, and a second portion frictionally engaging said radially outer portion of said diaphragm spring.

9. The clutch of claim 8, wherein said first portion of said at least one member of said damper is affixed to said housing.

10. The clutch of claim 8, wherein said second portion of said at least one member of said damper is fixed in the general direction of said axis.

11. The clutch of claim 1, wherein at least said portion of said clutch disc is subject to wear in response to repeated engagement and disengagement of the clutch, and further comprising means for compensating for said wear and including means for moving said pressure plate substantially axially toward said counterpressure plate.

12. The clutch of claim 11, wherein said portion of said clutch disc comprises friction linings.

13. The clutch of claim 11, wherein said means for moving includes means for moving said pressure plate toward said counterpressure plate relative to said diaphragm spring.

14. The clutch of claim 11, wherein said means for compensating further includes means for monitoring the extent of wear at least upon said portion of said clutch disc and for regulating the extent of movement of said pressure plate toward said counterpressure plate as a function of the monitored extent of said wear.

15. An engageable and disengageable friction clutch, comprising:
a housing rotatable about a predetermined axis;
a counterpressure plate coaxial and rotatable with said housing;
a pressure plate disposed between and coaxial with said housing and said counterpressure plate, said pressure plate being rotatable with said housing and having limited freedom of axial movement toward and away from said counterpressure plate;
a clutch disc coaxial with said housing and including a portion disposed between said plates;
means for engaging and disengaging the clutch;
a diaphragm spring reacting against said housing and arranged to urge said pressure plate against said portion of said clutch disc and to simultaneously urge said portion of said clutch disc against said counterpressure plate in the engaged condition of the clutch, said diaphragm spring having a tendency to perform stray movements relative to said housing; and
a frictional hysteresis damper operating between said clutch spring and at least one of said housing and said counterpressure plate to counteract said stray movements.

16. The clutch of claim 15, wherein said at least one member of said damper includes a first portion which is held against movement relative to said housing in the direction of said axis, and a second portion frictionally engaging a radially outer portion of said diaphragm spring.

17. The clutch of claim 16, wherein said diaphragm spring includes at least one diaphragm spring and said radially outer portion includes a marginal portion of said at least one diaphragm spring.

18. An engageable and disengageable friction clutch comprising a first axially fixed component including a housing rotatable about a predetermined axis; a second axially fixed component including a counterpressure plate coaxial and rotatable with said housing; a pressure plate rotatable with said housing and having limited freedom of axial movement toward and away from said counterpressure plate; a clutch disc including a portion disposed between said plates; means for engaging and disengaging the clutch; a diaphragm spring including an annular radially outer portion reacting against said housing to urge said pressure plate against said portion of said clutch disc and to urge said portion of said clutch disc against said counterpressure plate in the engaged condition of the clutch, said means for engaging and disengaging comprising prongs extending substantially radially inwardly from said annular radially outer portion of said diaphragm spring, at least one of said diaphragm and said pressure plate having a tendency to perform stray movements relative to said housing; a frictional hysteresis damper operating between said clutch spring and at least one of said axially fixed components of the clutch to counteract said stray movements, said damper being in frictional engagement with at least one of said diaphragm spring and said at least one axially fixed component, said damper including at least one member arranged to establish frictional hysteresis between said at least one axially fixed component and said diaphragm spring and at least a portion of said clutch disc being subject to wear in response to repeated engagement and disengagement of the clutch; and means for compensating for said wear including means for moving said pressure plate substantially axially toward said counterpressure plate.

19. The clutch of claim 18, wherein said at least one member of said damper operates between said diaphragm spring and said at least one axially fixed component.

20. The clutch of claim 18, wherein said at least one member of said damper includes a first portion which is held against movement relative to said housing in the direction of said axis, and a second portion frictionally engaging said radially outer portion of said spring.

21. The clutch of claim 20, wherein said radially outer portion includes a marginal portion of said spring.

22. The clutch of claim 18, wherein said portion of said clutch disc comprises friction linings.

23. The clutch of claim 18, wherein said means for moving includes means for moving said pressure plate toward said counterpressure plate relative to said diaphragm spring.

24. The clutch of claim 18, wherein said means for compensating further includes means for monitoring the extent of wear at least upon said portion of said clutch disc and for regulating the extend of movement of said pressure plate toward said counterpressure plate as a function of the monitored extent of said wear.

25. An engageable and disengageable friction clutch comprising a first axially fixed component including a housing rotatable about a predetermined axis; a second axially fixed component including a counterpressure plate coaxial and rotatable with said housing; a pressure plate rotatable with said housing and having a limited freedom of axial movement toward and away from said counterpressure plate; a clutch disc including a portion disposed between said plates; means for engaging and disengaging the clutch; a clutch spring including at least one diaphragm spring having a radially outer marginal portion, said at least one diaphragm spring reacting against said housing to urge said pressure plate against said portion of said clutch disc and to urge said portion of said clutch disc against said counterpressure plate in the engaged condition of the clutch, at least one of said at least one diaphragm spring and said pressure plate having a tendency to perform stray movements relative to said housing; and a damper operating between said at least one diaphragm spring and at least one of said axially fixed components of the clutch to counteract said stray movements, said damper being in frictional engagement with at least one said at least one diaphragm spring and said at least one axially fixed component and said damper including at least one member arranged to establish frictional hysteresis between said at least one axially fixed component and said at least one diaphragm spring, said at least one member including a first portion which is held against movement relative to said housing in the direction of said axis and a second portion including a plurality of projections frictionally engaging said radially outer portion of said at least one diaphragm spring.

26. The clutch of claim 25, wherein said projections are resilient and are stressed to bear upon said marginal portion of said at least one diaphragm spring in a direction substantially radially of and toward said axis.

27. The clutch of claim 25, wherein said first portion of said at least one member is annular and includes a radially inner part of one piece with said projections.

28. An engageable and disengageable friction clutch comprising a first axially fixed component including a housing rotatable about a predetermined axis; a second axially fixed component including a counterpressure plate coaxial and rotatable with said housing; a pressure plate rotatable with said housing and having limited freedom of axial movement toward and away from said counterpressure plate; a clutch disc including a portion disposed between said plates; means for engaging and disengaging the clutch; a clutch spring reacting against said housing to urge said pressure plate against said portion of said clutch disc and to urge said portion of said clutch disc against said counterpressure plate in the engaged condition of the clutch, at least one of said clutch spring and said pressure plate having a tendency to perform stray movements relative to said housing; and a damper operating between said clutch spring and at least one of said axially fixed components of the clutch to counteract said stray movements, said damper being in frictional engagement with at least one of said clutch spring and said at least one axially fixed component and said damper including at least one member arranged to establish frictional hysteresis between said at least one axially fixed component and said clutch spring, said at least one member including a first portion which is held against movement relative to said housing in the direction of said axis and a resilient second portion frictionally engaging a radially outer portion of said clutch spring, said resilient second portion being stressed to bear upon said clutch spring in a direction at least substantially radially of and toward said axis and said resilient second portion extending at least substantially in parallelism with said axis.

29. An engageable and disengageable friction clutch comprising a first axially fixed component including a housing rotatable about a predetermined axis; a second axially fixed component including a counterpressure plate coaxial and rotatable with said housing; a pressure plate rotatable with said housing; a pressure plate rotatable with said housing and having limited freedom of axial movement toward and away from said counterpressure plate; a clutch disc including a portion disposed between said plates; means for engaging and disengaging the clutch; a clutch spring reacting against said housing to urge said pressure plate against said portion of said clutch disc and to urge said portion of said clutch disc against said counterpressure plate in the engaged condition of the clutch, at least one of said clutch spring and said pressure plate having a tendency to perform stray movements relative to said housing; and a damper operating between said clutch spring and at least one of said axially fixed components of the clutch to counteract said stray movements, said damper being in frictional engagement with at least one of said clutch spring and said at least one axially fixed component and said damper including at least one member arranged to establish frictional hysteresis between said at least one axially fixed component and said clutch spring, said at least one member including a first portion which is held against movement relative to said housing in the direction of said axis and a resilient second portion frictionally engaging a radially outer portion of said clutch spring, said resilient second portion being stressed to bear upon said radially outer portion of said clutch spring with a force in the range between 200N and 2000N.

30. The clutch of claim 29, wherein said force is between 400N and 1000N.

31. An engageable and disengageable friction clutch comprising a first axially fixed component including a housing rotatable about a predetermined axis; a second axially fixed component including a counterpressure plate coaxial and rotatable with said housing; a pressure plate rotatable with said housing and having limited freedom of axial movement toward and away from said counterpressure plate; a clutch disc including a portion disposed between said plates; means for engaging and disengaging the clutch; a clutch spring including at least one diaphragm spring reacting against said housing to urge said pressure plate against said portion of said clutch disc and to urge said portion of said clutch disc against said counterpressure plate in the engaged condition of the clutch, at least one of said at least one diaphragm spring and said pressure plate having a tendency to perform stray movements relative to said housing; and a damper operating between said at least one diaphragm spring and at least one of said axially fixed components of the clutch to counteract said stray movements, said damper being frictional engagement with said at least one diaphragm spring and said at least one axially fixed component and said damper including at least one member arranged to establish frictional hysteresis between said at least one axially fixed component and said at least one diaphragm spring, said at least one member of said damper including a first portion which is held against movement relative to said housing in the direction of said axis and said at least one member of said damper further including a second portion frictionally engaging a radially outer portion of said at least one diaphragm spring, said radially outer portion of said at least one diaphragm spring including a marginal portion of said at least one diaphragm spring and said second portion of said at least one member of said damper including a plurality of projections.

32. The clutch of claim 31, wherein said projections are resilient and are stressed to bear upon said marginal portion of said at least one diaphragm spring in a direction substantially radially of and toward said axis.

* * * * *